3,303,217
OXIMINO-1 CHLORO-2-CYCLODODECADIENE 5,9 AND SALTS AND PROCESS FOR THE PREPARATION THEREOF
Michailas Genas, Paris, and Claude Poulain, La Courneuve, France, assignors to Societe Organico S.A., Paris, France, a corporation of France
No Drawing. Filed Dec. 2, 1963, Ser. No. 327,522
Claims priority, application France, Dec. 5, 1962, 917,588
10 Claims. (Cl. 260—566)

This invention relates to 1-oximino, 2-chloro-cyclododecadiene-5,9, the hydrochloride thereof and to a process for the preparation of these novel compounds.

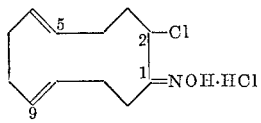

1-oximino, 2-chloro-cyclododecadiene-5,9 is a new industrial product, which in the form of white crystals, melts at 114°. It is characterized by absorption bands in the infrared at 3,315 cm.$^{-1}$ and 3,525 cm.$^{-1}$. It does not exhibit the absorption band characteristic of the nitroso derivative at 1,180 cm.$^{-1}$.

The close proximity of the chlorine and the oximino group, as well as the presence of the double bonds, confers on this compound a great chemical reactivity which makes it a material of primary importance for various syntheses, for example, the preparation of dodecanolactam by catalytic hydrogenation (L. I. Zakharkine, U.S.S.R. Patent No. 139,917, 56 C.A. 5853b, 1962).

It is known that when one reacts nitrosyl chloride alone with cyclododecatriene, one obtains the mono-nitrosochloride of cyclododecatriene. However, under these conditions it does not produce the hydrochloride of oximino-chloro-cyclododecadiene.

The process of the present invention consists of simultaneously reacting nitrosyl chloride and hydrochloric acid with 1,5,9-cyclododecatriene.

The cyclododecatriene is prepared, according to a known process, by cyclic trimerization of butadiene under the influence of an organometallic catalyst. Four stereoisomers are theoretically possible and two of these can be effectively characterized as having melting points of −18° and +34° C. All these stereoisomers as well as their mixture are suitable as a starting material for the present process.

The preparation of the hydrochloride of 1-oximino, 2-chloro-cyclododecadiene-5,9 can be represented by the following reaction:

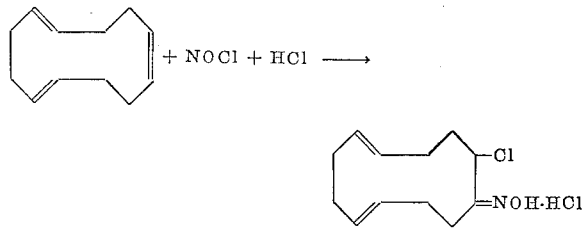

In the presence of an excess of hydrochloric acid the hydrochloride can contain more than one molecule of HCl bonded to the oximino group.

The hydrochloric acid is very weakly bonded to the oximino group. It can be readily eliminated in order to give the free 1-oximino, 2-chloro-cyclododecadiene-5,9. The elimination of HCl can be effected either by a hydrolysis treatment of the hydrochloride with water or by maintaining the hydrochloride under reduced pressure with continuous removal of the hydrochloric acid evolved, for example by placing it in a desiccating apparatus containing pieces of soda or potash.

According to the process of the invention, the nitrosyl chloride in either a liquid or gaseous state or dissolved in an inert solvent is gradually fed to a solution of the dodecatriene dissolved in an appropriate solvent. A controlled current of hydrochloric gas is passed through this solution so that the reaction medium remains constantly saturated with hydrochloric acid.

When nitrosyl chloride is used in a gaseous state, it can be introduced in mixture with the hydrochloric gas.

The solvents in which the cyclododecatriene is dissolved are hydrocarbons such as heptane, cyclohexane; chlorine-containing solvents such as methylene chloride, chloroform, carbon tetrachloride; or weak organic acids such acetic acid.

The molar ratio of the nitrosyl chloride to the cyclododecatriene can vary between about 0.8 and 1.3 and one obtains optimum results by employing from about 1 to 1.1 moles of nitrosyl chloride for each mole of cyclododecatriene. Use of lesser ratios of nitrosyl chloride diminishes the rate of conversion of cyclododecatriene and higher ratios reduce the efficiency of the conversion reaction by causing formation of secondary reactions and products.

The reaction temperature of the mixture of nitrosyl chloride and hydrochloric acid with the cyclododecatriene can vary between −30° and +30° C. and is preferably between −10 and +15° C.

According to the solvent employed the products formed either separate from or remain in solution because the hydrochloride form of the oximino derivative is soluble in the chlorine-containing solvents and in the weak aliphatic acids but is insoluble in hydrocarbon solvents from which it separates in the form of a heavy oil.

The isolation of the oximino-chloro-cyclododecadiene can be carried out in various manners.

(a) It can be effected by distillation of the solvent at a low temperature, for example below 35°, and under reduced pressure. When the residue is kept under a vacuum, the hydrochloric acid bonded to the oximino group is removed and one obtains the oximino compound in a free state.

(b) Instead of evaporating the solvent one can treat the reaction solution in water which causes hydrolysis of the hydrochloride.

In the case where the solvent is soluble in water, e.g., acetic acid, the oximino-chloro-cyclodiene precipitates as a solid and is separated by filtration. When the solvents are insoluble in water the free oximino composition remains in solution and it can be isolated by evaporation of the solvent under reduced pressure.

1-oximino, 2-chloro-dodecadiene-5,9 can be obtained in a very pure condition by re-crystallization. One can use methylene chloride in which the compound is readily soluble at 20° C. and very little soluble at −30° C.

The following examples are intended to illustrate the process of preparation which is the object of the present invention, but in no manner should they be considered as limiting the invention.

*Example 1*

In a 1-liter flask, provided with an agitator, a thermometer, a dropping funnel, a tube descending into the flask for introducing reagents and a venting tube, 162 grams (1 mole) of cyclododecatriene and 100 grams of methylene chloride are introduced. The solution is cooled to 10° and saturated by a current of gaseous HCl. By means of the dropping funnel 500 grams of a 13.1% solution of NOCl in methylene chloride (65.5 grams NOCl are 1 mole) are introduced under agitation over a period of approximately 1½ hours, while the temperature is maintained at 10° and bubbling of HCl is continued. When the introduction of the nitrosyl chloride solution is completed, the solvent is evaporated at 20° under reduced pressure. When all the solvent has disappeared an absorber containing granules of potash is interposed between the evacuation pump and the flask.

The residue in the flask comprises 227 grams of dry 1-oximino, 2-chloro-cyclododecadiene-5,9, melting at 103–104° C. On analysis the residue contained 15.4% Cl, calculated 15.6%.

*Example II*

The reaction was conducted under conditions identical to those of Example I. In order to isolate the compound, 400 cm.$^3$ of water is introduced into the reaction mixture while cooling to —2–3°, a white solid precipitate which is separated, washed in water until neutral, and dried under vacuum over phosphoric anhydride. 162 grams of 1-oximino, 2-chloro-cyclododecadiene-5,9 are obtained (Cl found, 15.6%, Cl calc., 15.6%) which melts at 112° to 114° C. The organic layer that was washed with water until neutral is dried over $Na_2SO_4$ and concentrated under vacuum to a third of its volume. It is cooled to —15° C. and 24 additional grams of the oximino compound are recovered to give an overall yield of 186 grams or an 82.8% conversion of the starting material.

*Example III*

162 grams (1 mole) of cyclododecatriene and 100 grams of cyclohexane are placed in the apparatus described in Example II and the mixture is cooled to 10° C. and saturated by a current of gaseous HCl. Approximately 400 grams of a cyclohexane solution of 16.5% nitrosyl chloride (1 mole) is poured in through the dropping funnel into the cyclohexane-triene mixture while continuing the passage of HCl gas. An insoluble heavy oil is formed. When the introduction of the nitrosyl chloride solution is completed, the agitation is stopped and the heavy oil is decanted. The floating layer of cyclohexane is drawn off and the remaining layer is treated by 3 liters of ice water. A precipitate, which is formed, is separated by filtration, washed with water and is dried in a desiccating apparatus with phosphoric anhydride. 190 grams of dry 1-oximino, 2-chloro-cyclododecadiene-5,9 are obtained.

*Example IV*

162 grams of cyclododecatriene and 100 grams of acetic acid are placed in the apparatus of Example I. The mixture is saturated with gaseous hydrochloric acid at 15°. While agitating and continuing the passage of HCl 437 grams of a 15% solution of nitrosyl chloride in acetic acid are added to the flask. The temperature is maintained between 10° and 15°. At the end of the introduction of the nitrosyl chloride the reaction mixture is a clear yellow solution. The major proportion of hydrochloric acid is eliminated by bubbling nitrogen through the solution and then 3 liters of ice water are added. An oil precipitate which slowly hardens into solid granules which are dried, washed until neutralized and dried over phosphoric anhydride. 219 grams of 1-oximino, 2-chloro-cyclododecadiene-5,9 are obtained.

What is claimed is:

1. A crystalline compound consisting of 1-oximino, 2-chloro-cyclododecadiene-5,9 melting at about 112° C. to 114° C., exhibiting I.R. absorption bands at 3315 cm.$^{-1}$ and 3525 cm.$^{-1}$ and failing to exhibit the characteristic nitroso band at 1180 cm.$^{-1}$.

2. A hydrochloride of the compound of claim 1.

3. A process for the production of 1-oximino, 2-chloro-cyclododecadiene-5,9 hydrochloride comprising reacting at a temperature of from about —30° C. to +30° C. a solution of 1,5,9-cyclododecatriene with nitrosyl chloride in the presence of an excess of hydrochloric acid, the molar ratio of nitrosyl chloride to cyclododecatriene being between about 0.8 to 1.3.

4. A process according to claim 3 in which the reaction is conducted at a temperature from about —10° C. to +15° C.

5. A process according to claim 4 in which the molar ratio of nitrosyl chloride to cyclododecatriene is between about 1.0 to 1.1.

6. A process according to claim 3 in which the hydrochloride of 1-oximino, 2-chloro-cyclododecadiene-5,9 is produced and comprising the additional step of converting said hydrochloride into the free 1-oximino, 2-chloro-cyclododecadiene-5,9.

7. A process according to claim 6 in which the conversion is effected by hydrolysis of the hydrochloride.

8. A process according to claim 7 in which the hydrolysis is effected by water.

9. A process according to claim 6 in which the conversion is effected by disassociation of the hydrochloride under vacuum at a temperature below 35° C.

10. A process according to claim 3 in which the reaction mixture is saturated with hydrochloric acid by the bubbling of hydrochloric gas therethrough.

References Cited by the Examiner

UNITED STATES PATENTS

| | | | |
|---|---|---|---|
| 2,890,248 | 6/1959 | Craig | 260—566 |
| 3,078,306 | 2/1963 | Schickh et al. | 260—566 |

FOREIGN PATENTS 139,317  11/1960  Russia.

OTHER REFERENCES

German printed application No. 1,138,038, Metzger et al.; pub. Oct. 18, 1962 (2 pp. spec.).

CHARLES B. PARKER, *Primary Examiner.*

ROBERT V. HINES, *Assistant Examiner.*

UNITED STATES PATENT OFFICE
CERTIFICATE OF CORRECTION

Patent No. 3,303,217                      February 7, 1967

Michailas Genas et al.

It is hereby certified that error appears in the above numbered patent requiring correction and that the said Letters Patent should read as corrected below.

Column 1, line 36, for "cyclododecatriene" read -- cyclododecadiene --; column 2, line 6, for "dodecatriene" read -- cyclododecatriene --.

Signed and sealed this 14th day of November 1967.

(SEAL)

Attest:

Edward M. Fletcher, Jr.

Attesting Officer

EDWARD J. BRENNER

Commissioner of Patents